April 30, 1935.  E. H. CURTIS, JR  1,999,444
CHARGE GUIDE FOR GLASS FEEDERS
Filed Jan. 4, 1932.  2 Sheets-Sheet 1

INVENTOR
Edna H. Curtis Jr.
BY
Word & Word
ATTORNEYS

April 30, 1935.  E. H. CURTIS, JR  1,999,444
CHARGE GUIDE FOR GLASS FEEDERS
Filed Jan. 4, 1932   2 Sheets-Sheet 2

INVENTOR
Edmund H. Curtis Jr.
BY
Wood & Wood
ATTORNEYS

Patented Apr. 30, 1935

1,999,444

UNITED STATES PATENT OFFICE 1,999,444

CHARGE GUIDE FOR GLASS FEEDERS

Edma H. Curtis, Jr., Cincinnati, Ohio, assignor, by mesne assignments, to Hartford-Empire Company, Hartford, Conn., a corporation of Delaware Application January 4, 1932, Serial No. 584,613

16 Claims. (Cl. 49—55)

This invention relates to glass machinery and is directed to improvements in the mold charge feeding apparatus of a glass machine. More particularly, the invention resides in an auxiliary device associated with the shear unit and adapted to maintain the accurate alignment of the severed charges. In this type of machine the glass is fed from a molten glass container through an orifice by means of a plunger or other type of feeding means, the molten glass, because of its viscous nature, depending in a mold charge mass from the orifice and at a predetermined time in the formation of the charge, being severed by means of automatically operated shears. The feed of the charge, after it has been severed, is by gravity, the severed charge dropping into a mold which may be aligned with the orifice.

It is the object of this invention to provide a charge guide, operable in timed arrangement with the shears for acting on the charge at the time when it is being sheared to prevent the deflection thereof from true alignment with the mold as would ordinarily occur due to the superposed arrangement of the blades of the shears, the lower blade having a tendency to bat or deflect the charge and to destroy aligned gravity feed.

Other objects and certain advantages will be more fully apparent from the description of the accompanying drawings, in which.

Figure 1:
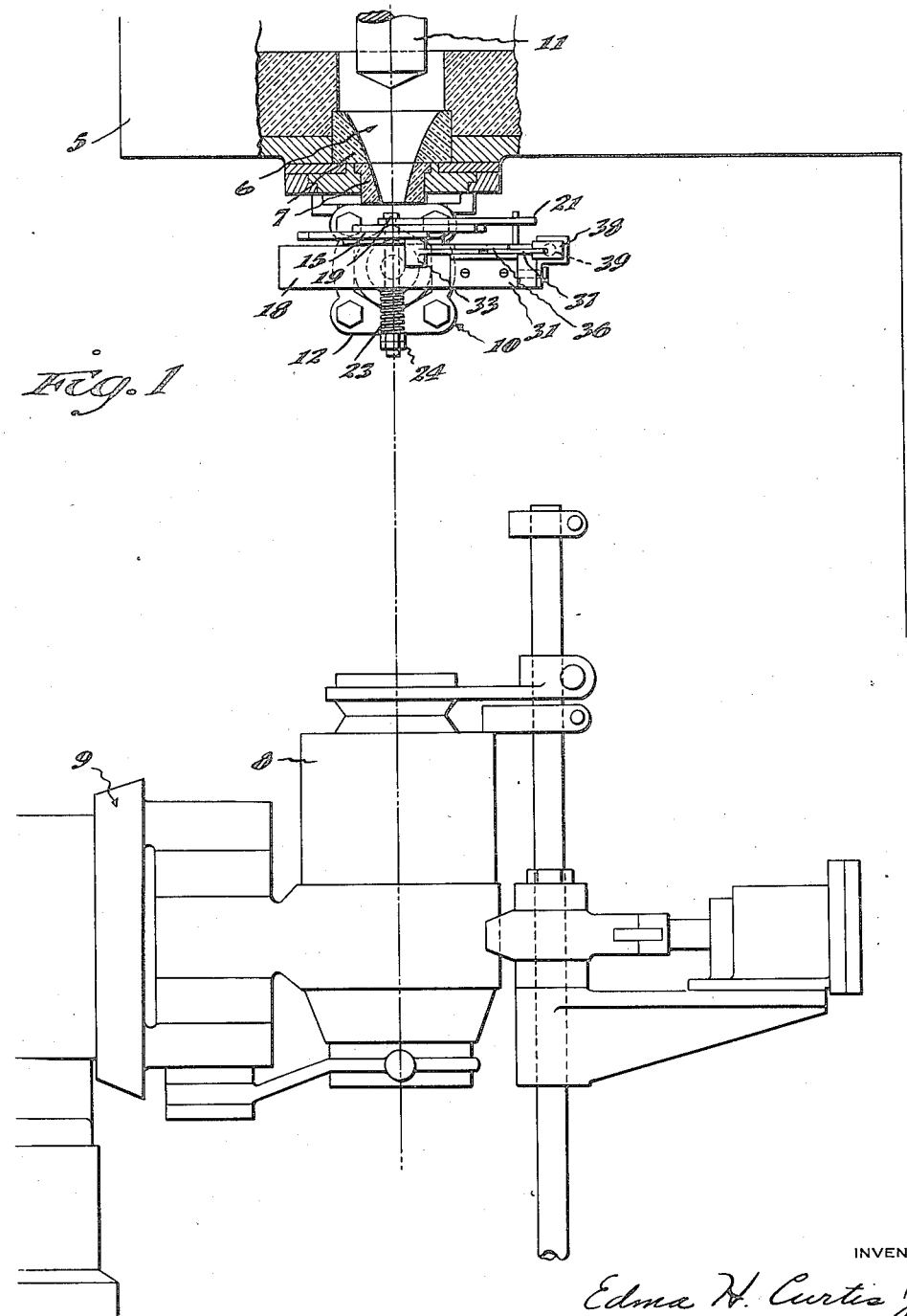
Figure 1 is a general view showing the relation of the glass feed tank, the shear unit and the mold machine.

The feed snout 5 of the molten glass container of the feeding apparatus is arranged with its discharge orifice 6, including the conventional flow rings 7 disposed above one of the molds 8 of the forming machine. The molds 8 of the glass forming machine are circumferentially arranged in a rotatable frame 9 which are successively aligned with and dwell beneath the discharge orifice 6 of the molten glass container.

The shear unit 10 is mounted on the molten glass container and is disposed horizontally just beneath the orifice, the shear blades being arranged for a cutting action crossing the axis of the glass machine orifice for severing the charge of glass fed through the orifice. A plunger 11 is shown for feeding the glass in the proper amounts.

The shear unit comprises in general, a cylinder 12, a piston (not shown), a shear support frame 14, shears 15 and a connection between the piston and the shears for actuating the shears. The shear support frame is formed of a pair of guide or slide rods 16 fixed in lugs 17 at each side of the cylinder 12 and extended in parallelism forwardly therefrom. A shear pivot support block 18 is supported on and connects the outer ends of the rods 16.

The shear pivot support block 18 has a pivot pin 19 disposed vertically centrally thereof for the shear blades which are superposed and supported upon the block. The pin has a circumferential groove 20 in its upper end engaged by the swinging end of a pivot latch 21, the latch including a slot 22 for the purpose of the pin engagement of a width equal to the diameter of the pin at the base of the groove so that the latch will slip about the pin within the groove.

At the lower end of the pivot pin, the shears carry a spring 23 under compression between the bottom of the block and adjustment nuts 24 on the screw-threaded lower end of the pin. The shear blades are relatively thin and include curved or concave cutting edges for partially encircling the gob as each is brought toward it.

These shear blades are operatively connected to the piston by means of a travelling block 25 attached to the outer end of the piston rod 26 and slidably disposed on the guide rods. This travelling block is connected to the respective shear blades by links 27. The links have a common pivotal connection to the travelling block centrally thereof by means of a pin 28, latch 29 and spring 30, arranged in the same manner as at the pivot of the shear blades. These links are connected at their outer ends each to a respective shear blade toward the outer corner of the blade. The springs 23, 30 on the respective pivot pins maintain the parts in close contact, particularly the shear blades whereby an efficient shearing action occurs.

The stroke of the shears is limited in both directions by means of a stop rod 25ª fixed to the block 25 and extended parallel with the air motor piston travel. This rod is slidably mounted in a lug extended from the air motor and carries an abutment element 25ᵇ slidably mounted on an abutment stud 25ᶜ, the abutment element operable between opposing stop shoulders 25ᵈ formed on the abutment stud. The opening and closing movements of the shears are therefore definitely controlled.

The charge guiding device which counters the bat or deflecting action of the shears, specifically the lower blade thereof, is located beneath the upper blade and facing the lower blade. The operative connection for this device is to the travelling block 25 of the shear unit and its mounting is in the stationary shear support 14. For the purpose of the mounting, an angle iron bracket 31 is fixed to the forward end of the support block 18, this bracket providing a horizontal flange having an arcuate slot 32 therein.

The guide element comprises a blade 33 of arcuate or semi-cylindrical form, which blade is disposed parallel to the axis of the charge and provides a relatively long contact surface. An arm 34 extends from the rear side of this blade and carries a pin 35 disposed in the arcuate slot 32.

A bell crank lever 36 is pivoted on the bracket and has one arm pivotally connected to an intermediate point of the arm 34 of the deflector element and the other arm pivotally connected by means of a link 37 to the head 38 of a slide rod 39 mounted in the support bracket 18 in parallelism with the guide rods.

Figure 2:
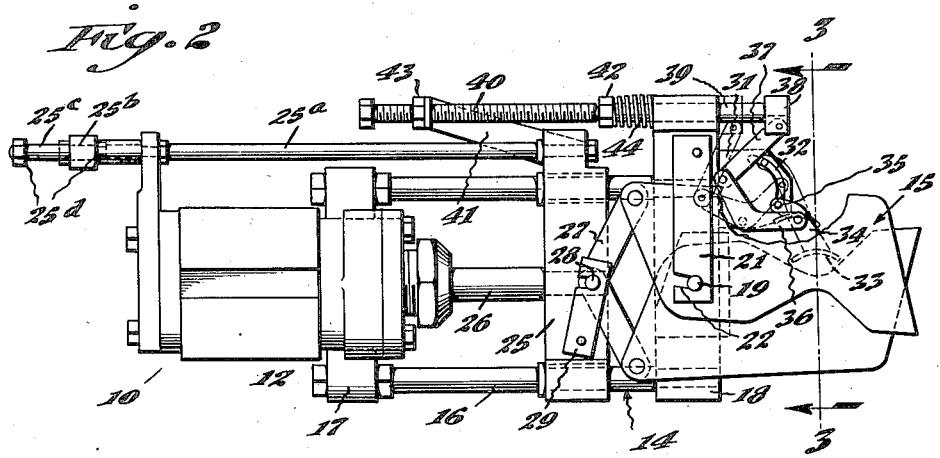
Figure 2 is a top plan view of a shear unit showing the charge guide incorporated therein.

As will be noted from Figure 2, the pivot point for the bell crank lever is at the inner edge of the bracket 31 toward the cutting line of the shears, the arcuate slot being located outwardly of this pivot point. Translation of the slide rod 39 causes travel of the guide blade 33 toward and from the charge, the pin 35 thereof moving in the arcuate slot 32 and the relation of the pin and the pivotal connection of the arm of the bell crank lever to the guide element determining the path of movement of the guide element toward and from the charge.

The deflector element is actuated by the shear operating means. For this purpose a long screw 40 is mounted in a bracket 41 fixed to the travelling block, this screw being disposed in parallelism with the guide rods 16 and in alignment with the slide rod 39 for engaging the headed end 42 of the slide rod. The screw 40 is adjustably screwed through the bracket and is set in position by means of a nut 43. The slide rod 39 is automatically returned by means of a spring 44 under compression about the same between its head 42 and the support block 18.

Figure 3:
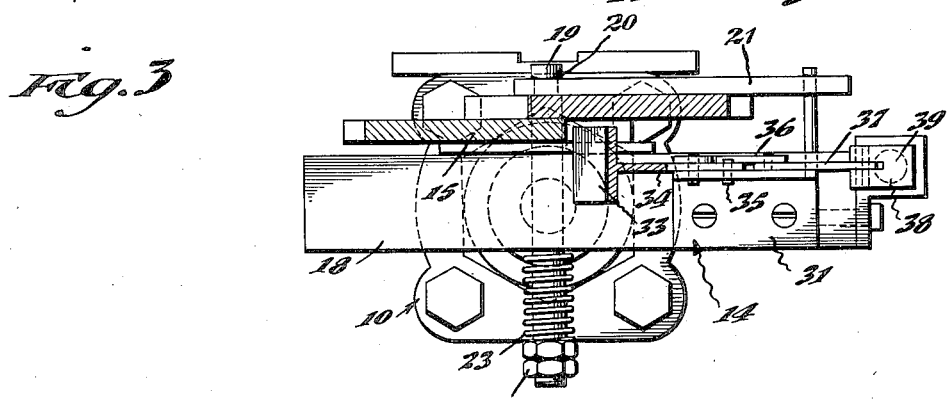
Figure 3 is a sectional view taken on line 3—3, Figure 2, detailing the charge guide in position of use.
Figure 4:
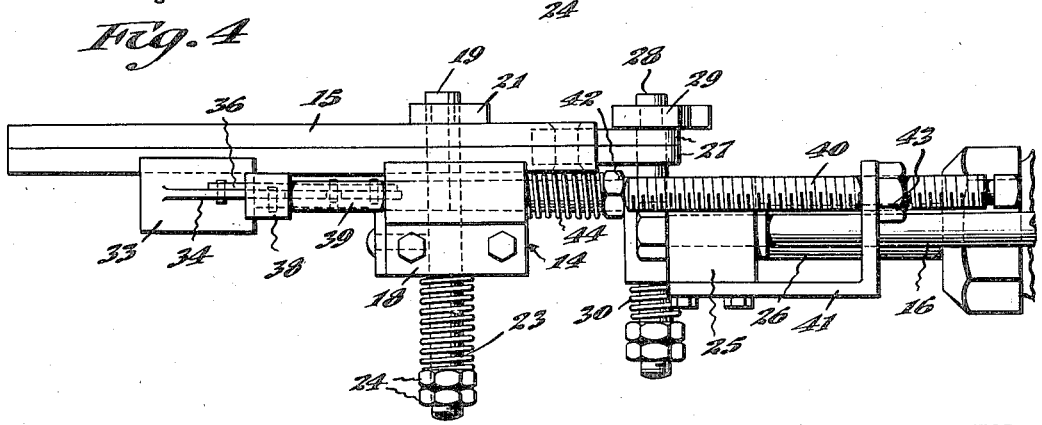
Figure 4 is a side elevation of the shear unit.

The operation of the device is as follows: As the air motor of the shear unit is effective for moving the travelling block 25 outwardly and closing the shears to sever a charge, the long screw 40 is carried forwardly with the travelling block and engages the head 42 of the slide rod, compressing the spring 44 and swinging the bell crank lever 36 on its pivot by means of the link 37. This moves the deflector element from its retracted inactive position toward the extended axial line of the glass discharge orifice and to position to engage with the glass being severed. This movement of the deflector may be between the positions indicated in Fig. 2, the projected or active position of the deflector also being shown to advantage in Figs. 1 and 3.

The path of movement of the deflector element which is substantially radially of the suspended charge is toward the charge at the side thereof opposite to that engaged by the lower shear blade. This guide action is effective for stopping swinging of the charge under the pressure of the lower blade and therefore prevents the charge deflection usually occurring at this point. The movement of the deflector element is timed with the movement of the shears so that at the moment when the greatest pressure is exerted in the severing operation, the deflector blade is correctly positioned for serving as an abutment for the charge.

Having described my invention, I claim:

1. In a glass machine, a glass container including an orifice, means for feeding glass through said orifice in successive suspended masses, and a mold mounted beneath said orifice in alignment therewith; shear mechanism interposed between the orifice and the mold and adapted to shear charges from the glass depending from the orifice, a guide adapted to engage each charge at the side thereof opposite to the side engaged by the lower blade of the shears for preventing deflection of the charge during severance thereof, a pivotal mounting for said guide independent of any moving part of said shear mechanism, and a slide operated by said shear mechanism and adapted to move said guide on its pivotal mounting relative to the charge to be severed.

2. In a glass machine, shears for severing mold charges of molten glass from successive masses of glass in suspension from a discharge orifice, operating means therefor, a movable charge guide of semi-cylindrical form disposed opposite the lower blade of the shears and adapted to engage about each charge at the side opposite to the side engaged by the lower blade of the shears, a support for said movable charge guide including an arcuate slot, said charge guide including an arm, a pin carried by said arm and engaged in the slot, a bell crank lever pivoted on said support and having one arm pivotally attached intermediate of the charge guide, an actuating screw carried by the shear operating means and disposed parallel with the travel thereof, a slide rod having one end attached to the second arm of the bell crank lever and including a head engaged by the end of said actuating screw, a spring compressibly engaged under the head of the slide rod, whereby movement of the shear actuating means moves the charge guide toward and from the charge, and said spring acts to return said charge guide.

3. In a glass machine, shears for severing mold charges of molten glass from successive masses of glass in suspension from a discharge orifice, means for actuating said shears, a movable charge guide adapted to engage each charge at the side opposite to the side engaged by the lower blade of the shears and adjacent thereto, a support for said charge guide, a movable driving contact element carried by the shear actuating means, a slide rod, a lever connecting said slide rod and said charge guide, said slide rod disposed for engagement by said contact element for actuation of said charge guide, and a spring for returning said charge guide after actuation by said contact element.

4. In a glass machine, shears for severing mold charges of molten glass from successive masses of glass in suspension from a discharge orifice, means for actuating said shears, a movable charge guide adapted to engage each charge at the side opposite to the side engaged by the lower blade of the shears and adjacent thereto, a support for said charge guide, a movable driving contact element carried by the shear actuating means, a slide rod, and a lever connecting said slide rod and said charge guide, said slide rod disposed for engagement by said contact element and actuation of said charge guide.

5. In a glass machine, shears for severing mold charges of molten glass from successive masses of glass in suspension from a discharge orifice, an operating means for said shears, a movably mounted charge guide of semi-cylindrical form having its concave side disposed for engaging each charge adjacent the lower blade of the shears, means independent of the shears and the shear operating means for pivotally and slidably mounting said charge guide, and an operative connection between the shear operating means and the charge guide for moving the guide relative to the lower blade of the shears and in synchronism therewith for preventing disalignment of the charge at the time of its severance by the shears.

6. In glass feeding apparatus, a pair of movable shear blades adapted to be closed to sever a mold charge from a pendant column of glass below a glass feed outlet and to be opened to move said blades away from said column of glass, a guide movable between an active position at which it will prevent lateral deflection of the charge as such charge is severed from said column by the closing of said shear blades and an inactive position spaced laterally from said column of glass, and unitary operating mechanism for opening and closing said shear blades and for moving said guide relatively to said shear blades and between said active and inactive positions.

7. In glass feeding apparatus, glass severing mechanism including a shear blade movable to and from a glass charge severing position, a guide movable to and from an active position at which it will prevent lateral batting of the charge as such charge is severed by said severing mechanism, and unitary operating mechanism for periodically moving said shear blade to its charge severing position and for substantially simultaneously moving said guide to its active position but with a stroke different from that of said shear blade.

8. In glass feeding apparatus, the combination of a pair of pivoted shear blades for severing a mold charge from a pendant column of glass below a glass feed outlet, a pivoted guide movable to and from a position to prevent lateral deflection of the charge as it is severed by said shear blades, and unitary operating mechanism for opening and closing the shear blades and for moving the guide to and from its said position and also relatively to the shear blades as said shear blades are opened and closed.

9. In glass feeding apparatus, a pair of movable shear blades adapted to be closed to sever a mold charge from a pendant column of glass below a glass feed outlet and to be opened to move said blades away from said column of glass, a guide movable from an active position at which it will prevent lateral deflection of said mold charge as such charge is severed by said shear blades and an inactive position spaced laterally from said glass column, and unitary operating mechanism for opening and closing the shear blades and for substantially simultaneously moving the guide between its active and inactive positions at a speed different from that of the movement of each of said shear blades.

10. In glass feeding apparatus, a pair of shear blades movable to closed position to sever a mold charge from a pendant column of glass below a glass feed outlet and to opened position to remove the shear blades from the immediate proximity of said column of glass, a guide movable to an active position at which it will prevent lateral deflection of the charge as such charge is severed by the closing of said shear blades and to an inactive position at which the guide is spaced laterally from said column of glass, and unitary operating mechanism for substantially simultaneously closing the shear blades and moving said guide to its active position along a path different from that of the path of movement of each of said shear blades and at a different rate of speed from that of the closing movement of each of said shear blades and for thereafter substantially simultaneously opening said shear blades and for moving said guide to its inactive position.

11. In glass feeding apparatus, a pair of shear blades movable to closed position to sever a mold charge from a pendant column of glass below a glass feed outlet and to opened position to remove the shear blades from the immediate proximity of said column of glass, a guide movable to an active position at which it will prevent lateral deflection of the charge as such charge is severed by the closing of said shear blades to an inactive position at which the guide is spaced laterally from said column of glass, unitary operating mechanism for substantially simultaneously closing the shear blades and moving said guide to its active position along a path different from that of the path of movement of each of said shear blades and for thereafter substantially simultaneously opening said shear blades and moving said guide to its inactive position, and means for adjusting the path of movement of the guide with respect to the pendant column of glass below said outlet and independently of adjustment of the path of movement of either of said shear blades.

12. In glass feeding apparatus, a pair of movable shear blades adapted to be closed to sever a mold charge from a pendant column of glass below a glass feed outlet, a charge guide movable toward and away from said column of glass at the same side of the latter as one of said shear blades, and unitary operating mechanism for opening and closing said shear blades repeatedly and for moving said guide toward said column of glass each time the shear blades are closed and away from said column of glass each time the shear blades are opened, said unitary mechanism being of such character as to move said guide toward said column of glass along a path shorter than the path of movement of the shear blade that approaches said column of glass at the same side as said guide.

13. In glass feeding apparatus, a pivoted shear blade, a pivoted charge guide located below said shear blade, said shear blade and said charge guide both being disposed at the same side of a pendant column of glass below a vertical glass feed outlet, and unitary actuating mechanism for periodically swinging said shear blade and said guide toward said pendant column of glass with the stroke of the guide shorter than that of the shear blade, and means for adjusting the stroke of said guide relatively to the stroke of said shear blade.

14. In glass feeding apparatus, a pair of pivoted shear blades adapted to be closed to sever a mold charge from a pendant column of glass below a feed outlet and to be opened to remove said blades from the immediate proximity of said column, a pivoted guide located at the same side of said column as one of said shear blades, and a reciprocating member connected with said shear blades and imparting movement to said guide for moving said shear blades and said guide substantially simultaneously but with the speed of movement of the guide different from that of either of said shear blades.

15. In glass feeding apparatus, the combination with a pair of pivoted shear blades adapted to be closed to sever a mold charge from a pendant column of glass below a glass discharge outlet, of a charge guide movable toward and from said column of glass at the same side of said column as one of said shear blades, a reciprocating member having periodic strokes, each effective to close said shear blades, means actuated on each of said strokes of said reciprocating member to move said guide toward said column of glass at a speed different from that of either of said shear blades, and spring means for moving said guide away from said column of glass when the operation of said reciprocating member will permit and tending to stabilize the movement of said guide irrespective of variations in the movements of the pivoted shear blades.

16. In glass feeding apparatus, a pair of pivoted shear blades for severing a charge of glass from a pendant column of glass below a glass feed outlet, operating mechanism having cycles of operations, each effective to close and open said shear blades, a charge guide movable between an active position at which it will prevent lateral deflection of said charge as it is severed by the closing of said shear blades and an inactive position spaced laterally from said column of glass, means actuated by said operating mechanism to move said guide to its active position substantially simultaneously with the closing of the shear blades but at a speed different from that of either of the shear blades, and a spring acting continuously on said guide to tend to return said guide to its inactive position, said spring being overcome periodically by said operating means so as to be ineffective to prevent movement of said guide to its active position as said shear blades are closed.

EDMA H. CURTIS, Jr.